Sept. 10, 1935.   C. S. HALL   2,013,652
METHOD FOR THE PRODUCTION OF NITROGEN AND HYDROGEN
BY THE THERMAL DECOMPOSITION OF AMMONIA
Filed June 3, 1932
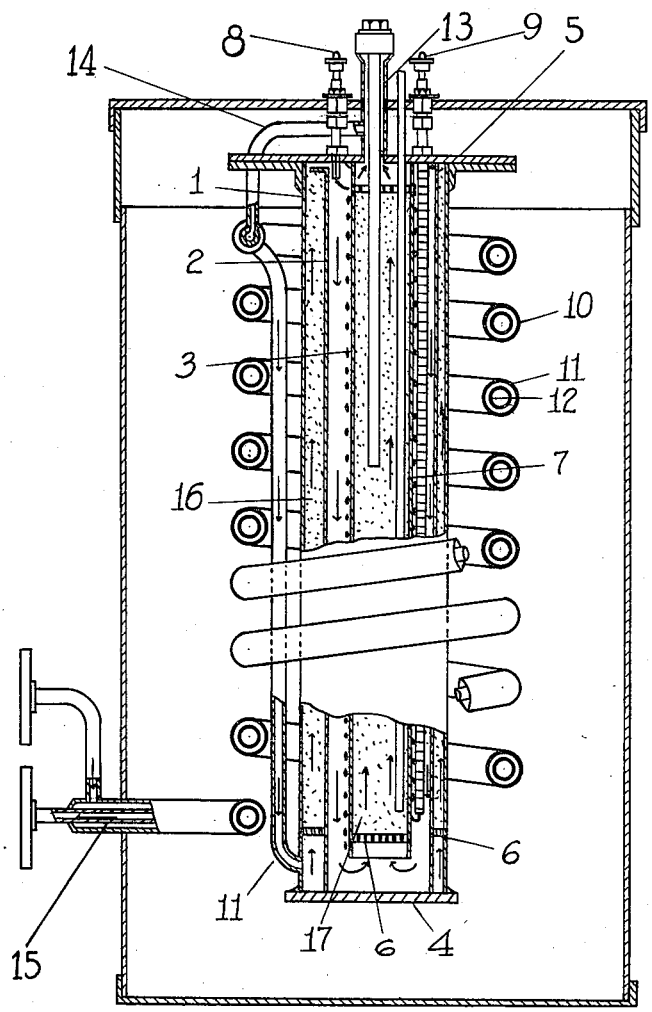
INVENTOR.
Cecil Stuart Hall
BY
W. R. Gawthrop
ATTORNEY.

Patented Sept. 10, 1935

2,013,652

UNITED STATES PATENT OFFICE 2,013,652

METHOD FOR THE PRODUCTION OF NITROGEN AND HYDROGEN BY THE THERMAL DECOMPOSITION OF AMMONIA

Cecil Stuart Hall, Norton Hall, The Green, Norton-on-Tees, England, assignor to Imperial Chemical Industries Ltd., a corporation of Great Britain Application June 3, 1932, Serial No. 615,098
In Great Britain June 4, 1931

2 Claims. (Cl. 23—7)

This invention relates to a process for the thermal decomposition of ammonia for the purpose of producing gaseous mixtures of hydrogen and nitrogen.

It is desirable for many purposes to have a ready source of hydrogen and nitrogen, for example in welding processes, where large quantities of the gases are not required but a convenient and inexpensive source is necessary. These gases may be obtained in an economical manner by decomposing ammonia gas, but certain precautions have to be observed since if ammonia is passed over an electric heater in order to raise the temperature of the gas to that required for the reaction, the gas attacks the metal winding of the heater, nitriding it, and in a very short time the heater is put out of action.

In order to overcome this difficulty, the present invention provides a method whereby ammonia is decomposed by passage over a suitable catalyst in two stages, with the interposition of an electric heater between the two stages, at which point the amount of ammonia in the gas is insufficient to cause damage to the metal winding of the heater, the gases from the final stage of the process being allowed to impart their heat to the incoming ammonia, thus preheating this gas to a high temperature before admission to the first stage. The temperature of reaction is preferably maintained at about 550° C. The bulk of the decomposition takes place in the first stage and it is therefore preferable that the vessels employed be made of stainless steel or of Monel metal which are not appreciably attacked under the reaction conditions. In the heat exchanger the temperature of the gas is below that for optimum decomposition and the effect of nitriding may therefore be neglected, mild steel or wrought iron being suitable materials of construction in this case.

The invention also consists in an arrangement of apparatus for carrying out the above described method, comprising a cylindrical vessel containing two separate catalyst beds, an electric heater, and a cooled tube heat exchanger surrounding the said vessel. This arrangement leads to a very compact apparatus and minimizes heat losses.

A preferred method of carrying out the invention is illustrated in the accompanying drawing in which the figure is a section of a suitable apparatus. Referring to the drawing, the apparatus consists essentially of three concentric tubes, 1, 2, and 3, the outer and intermediate pipes being welded to the bottom cover 4 and the inner pipe being welded to the top cover 5. Spaces are left between the tubes, 2, 3 and the cover plates 5, 4 respectively. Two annular spaces and a central tube are thus formed, the outer annular space and the central tube being filled with a suitable catalyst, e. g. magnetic oxide of iron containing small amounts of potash and alumina, which has been reduced in hydrogen. The catalyst is supported on grids 6, as shown. The central tube is wound externally with an electric heater winding 7, which is connected to the insulated terminals 8 and 9, passing through the top cover of the apparatus, which are connected to any convenient source of electrical energy.

Surrounding the system of concentric tubes is a coiled tube heat exchanger 10 consisting of two concentric pipes 11 and 12. The apparatus so far described is placed in a casing and the intervening space is packed with solid heat insulating material. The heat contained in the exit gases is transferred in the exchanger to the incoming ammonia, which passes through the annulus. The ammonia may be introduced in the gaseous form or preferably as liquid anhydrous ammonia; in the latter case the heat exchanger also acts as a vaporizer, enabling a separate vaporizer to be dispensed with. In the case where liquid ammonia is used, automatic temperature control of the catalyst is obtained owing to the fact that an increase of temperature therein results in increased evaporation of liquid ammonia and consequent withdrawal of heat from the catalyst owing to the endothermic nature of the reaction.

A pyrometer passes through a sheath 13 fixed to the top cover of the apparatus, use being also made of this sheath to lead the gases out of the last catalyst chamber 17 to the heat exchanger by the tube 14. The apparatus is operated by passing ammonia through the annulus 15 of the heat exchanger 10 where it is heated by the gases passing through the coil 12, and enters the outer catalyst chamber 16. The gas is decomposed in this chamber by passage over the catalyst therein and the gas mixture, consisting of residual ammonia, hydrogen and nitrogen, passes downwardly over the electric heater 7, when it is heated to a temperature slightly higher than the reaction temperature. The hot gases then pass upwardly through the second catalyst chamber 17 where the decomposition is completed, and leave the apparatus by the pipe 12, heating the incoming ammonia passing through the annulus 11 to a high temperature.

I claim:

1. Method of producing gaseous mixtures of nitrogen and hydrogen which consists in passing ammonia over a suitable catalyst at a raised temperature, in two stages, with the interposition of an electric heater between the two stages at a point such that the amount of ammonia in the gas is insufficient to cause damage to the metal winding of the heater, the gases from the final stage of the process being allowed to impart their heat to the incoming ammonia, thus preheating the same to a high temperature before admission to the first stage.

2. Method as claimed in claim 1, in which the sensible heat of the gases from the final stage of the process is utilized to vaporize liquid anhydrous ammonia and to preheat the resulting ammonia gas prior to its admission to the first stage.

CECIL STUART HALL.